United States Patent
Yi et al.

(10) Patent No.: US 6,542,279 B2
(45) Date of Patent: Apr. 1, 2003

(54) IMAGE SCANNER CAPABLE OF SCANNING REFLECTIVE AND PENETRATIVE DOCUMENTS

(75) Inventors: Lee Ta Yi, Taipei (TW); Lin Chang Yao, Taipei (TW)

(73) Assignee: Silitek Corporation, Taipei (TW)

( * ) Notice: Subject to any disclaimer, the term of this patent is extended or adjusted under 35 U.S.C. 154(b) by 0 days.

(21) Appl. No.: 09/934,733

(22) Filed: Aug. 22, 2001

(65) Prior Publication Data

US 2002/0186441 A1 Dec. 12, 2002

(30) Foreign Application Priority Data

Jun. 11, 2001 (TW) ...................................... 90209695 U (51) Int. Cl.[7] .............................................. G02B 26/08
(52) U.S. Cl. ...................... 359/210; 359/212; 358/483; 358/497; 250/234
(58) Field of Search ................................ 359/196–198, 359/209–210, 205, 212; 358/474, 483, 487, 494, 497; 250/234–235, 208.1; 399/199–201

(56) References Cited

U.S. PATENT DOCUMENTS 6,169,611 B1 * 1/2001 Brook, III et al. .......... 358/487

* cited by examiner

*Primary Examiner*—James Phan
(74) *Attorney, Agent, or Firm*—Volpe & Koenig, P.C.

(57) ABSTRACT

An image scanner capable of scanning reflective and penetrative documents is provided. The image scanner includes a housing, a supporting base mounted in the housing and moving along the first direction while scanning, a first scanning platform mounted on the housing for placing thereon the reflective document, a first light transmitting device mounted fixedly on the supporting base for focusing and transmitting light signal, a first photoelectric sensing element mounted fixedly on the supporting base for receiving the reflected light signal and converting the received light signal into electric signal, a second scanning platform mounted in the housing for placing thereon the penetrative document, a second light transmitting device mounted fixedly on the supporting base for focusing and transmitting light signal, and a second photoelectric sensing element mounted fixedly on the supporting base for receiving the penetrating light signal and converting the penetrating light signal into electric signal.

12 Claims, 7 Drawing Sheets

IMAGE SCANNER CAPABLE OF SCANNING REFLECTIVE AND PENETRATIVE DOCUMENTS

FIELD OF THE INVENTION

The present invention is related to an image scanner capable of scanning reflective and penetrative documents, and more particularly, to a flat bed image scanner capable of scanning reflective and penetrative documents.

BACKGROUND OF THE INVENTION

In the past, image scanners are principally divided into two types according to different scanning objects. One is the reflective document image scanner for scanning reflective documents, such as documents and papers. The other is the penetrative document image scanner for scanning positive and negative films, such as slides and films. These two types of image scanners have different requirement for resolution (generally, the penetrative document image scanner has higher requirement for resolution than the reflective document image scanner), therefore, their cost is very different. Typically, the reflective document image scanner is usually made in the form of flat bed scanner, and the penetrative document image scanner is made in the form of film scanner.

However, with the development of continually increasing resolution and application range for a flat bed scanner, the function of scanning transparent document has been merged into the flat bed scanner to increase its additional value. In the present market, there are two main designing points of a flat bed scanner which have the function of scanning transparent document. One is implemented by using the same optical system design to co-operate with the transmission mechanism and to switch different camera lens or charge-coupled devices (CCD). The other is performed by using different optical system design to co-operate with the transmission, mechanism and the same camera lens or CCD. The former will cause the increasing of error variability and lead to an extremely low yield if using the transmission mechanism and switching different camera lens or CCD. The later will be difficult to practice when considering the cost and the image quality if using different optical system design to co-operate with the transmission mechanism and the same camera lens or CCD. It is because that the producer must choose the CCD with higher density and larger numbers of pixels to considerate both sides of the high resolution scanning image quality of a small-sized film and the required pixel number of a large-sized paper document. Take the $A_4$-sized CCD with resolution of 3600 dpi (dots per inch) as an example, the number of pixel is about 30600 points and the cost price is about 50 to 60 times compared to the CCD with 600 dpi, and is about 15 to 20 times compared to the CCD with 1200 dpi. In that case, the cost of product is too high. If we choose the cheaper CCD, under the designing construction described above, the high quality image scanning effect of a small-sized film can not be achieved.

SUMMARY OF THE INVENTION

It is an object of the present invention to provide an image scanner capable of scanning reflective and penetrative documents by using a simple and effective design of optical system and transmission module.

It is another object of the present invention to provide an image scanner capable of scanning reflective and penetrative documents, thereby expanding its application.

According to the present invention, the image scanner includes a housing, a supporting base, a first scanning platform, a first light transmitting device, a first photoelectric sensing element, a second scanning platform, a second light transmitting device, and a second photoelectric sensing element. The supporting base is mounted in the housing and moves along the first direction while the scanning operation is performed. The first scanning platform is mounted on the housing for placing thereon the reflective document to be scanned. The first light transmitting device is mounted fixedly on the supporting base for focusing and transmitting light signal reflected from the reflective document. The first photoelectric sensing element is mounted fixedly on the supporting base and has a first number of pixel sensing points for receiving the reflected light signal and converting the received light signal into electric signal. The second scanning platform is mounted in the housing for placing thereon the penetrative document to be scanned. The second light transmitting device is mounted fixedly on the supporting base for focusing and transmitting light signal penetrating through the penetrative document. The second photoelectric sensing element is mounted fixedly on the supporting base and has a second number of pixel sensing points for receiving the penetrating light signal and converting the penetrating light signal into electric signal, wherein the first number is larger than the second number.

Preferably, the housing is a flat bed image scanner housing.

Preferably, the first photoelectric sensing element and the second photoelectric sensing element are accomplished by charge-coupled devices (CCD).

Preferably, the first light transmission device includes a first reflective mirror module mounted fixedly on the supporting base for reflectively transmitting the reflected light signal from the reflective document, and a first lens module mounted fixedly on the supporting base for focusing the reflected light signal reflected from the first reflective mirror module to the first photoelectric sensing element to be received.

Preferably, the second light transmission device includes a second reflective mirror module mounted fixedly on the supporting base for reflectively transmitting the penetrating light signal from the penetrative document, and a second lens module mounted fixedly on the supporting base for focusing the reflected light signal reflected from the second reflective mirror module to the second photoelectric sensing element to be received.

Preferably, the reflective and penetrative documents are a paper document and a film.

Preferably, the image scanner further includes a first light source mounted fixedly on the supporting base for providing a light source to the first scanning platform while the scanning operation of the reflective document is performed.

Preferably, the image scanner further includes a second light source mounted fixedly on the supporting base for providing a light source to the second scanning platform while the scanning operation of the penetrative document is performed.

Preferably, the image scanner further includes a second light source mounted fixedly on the housing, and which is made of background light source module for providing a light source to the second scanning platform while the scanning operation of the penetrative document is performed.

Preferably, the image scanner further includes a third light source mounted above the first scanning platform for providing a light source to penetrate a second penetrative document placed on the first scanning platform while the scanning operation of the second penetrative document is performed.

Preferably, the penetrating light signal from the second penetrative document is focused by the first light transmission device and transmitted to the first photoelectric sensing element.

Preferably, the size of the reflective document is larger than that of the penetrative document.

Preferably, the size of the reflective document is larger than that of the penetrative document.

Preferably, the resolution of the second light transmission device is better than that of the first light transmission device.

The foregoing and other features and advantages of the present invention will be more clearly understood through the following descriptions with reference to the drawings, wherein:

DETAILED DESCRIPTION OF THE PREFERRED EMBODIMENT

Figure 1A:
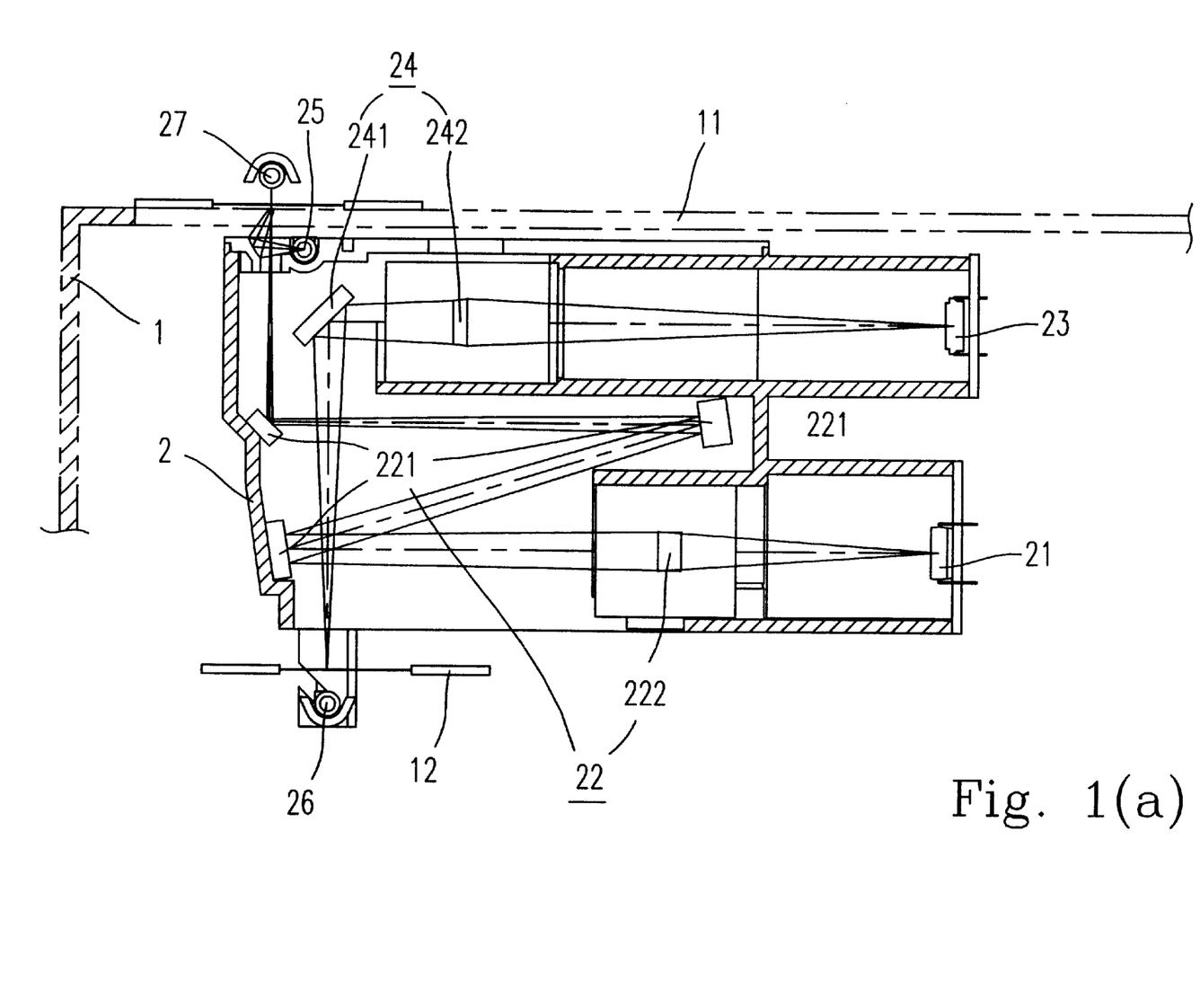
FIGS. 1(a) and 1(b) are sectional diagrams of the supporting base showing two preferred embodiments for the image scanner capable of scanning reflective and penetrative documents according to the present invention.

The present invention will now described more specifically with reference to the following embodiments. Please refer to FIG. 1(a) which is the sectional diagram of the supporting base showing the preferred embodiments for the image scanner capable of scanning reflective and penetrative documents according to the present invention. In FIG. 1(a), the first scanning platform 11 and the second scanning platform 12 are used for placing thereon the reflective and penetrative documents respectively to be scanned. The reflective document is usually an $A_4$-sized paper, while the penetrative document is a 35 mm film according to the practical application. The supporting base 2 is used for supporting a first photoelectric sensing element 21, a first light transmitting device 22, a second photoelectric sensing element 23, a the second transmitting device 24 mounted fixedly thereon and moves along the slideway (not shown) by the stepping motor (not shown) while the scanning operation is performed.

It will be clearly found that the housing 1 is a flat form image scanner housing, while the first photoelectric sensing element 21 and the second photoelectric sensing element 23 are accomplished by the charge coupled device (CCD). The first light transmitting device 22 includes a first reflective mirror module 221 and a first lens module 222, while the second transmitting device 24 includes a second reflective mirror module 241 and a second lens module 242.

In order to overcome the drawbacks described above, the first photoelectric sensing element 21, the first light transmitting device 22, the second photoelectric sensing element 23, and the second transmitting device 24 are all mounted fixedly on the supporting base 2. Thus, the drawback of low yield resulted from increasing error variability, which is caused by using the transmission mechanism and switching different camera lens or CCD will be overcome. In order to possess either the high resolution scanning image quality of a small-sized film or the required numbers of pixels of a large-sized paper document, the present invention uses the second transmitting device 24 with a better resolution compared with the first light transmitting device 22 and the second photoelectric sensing element 23 with a lower resolution and pixel number compared with the first photoelectric sensing element 21 to scan a small-sized film. For example, to considerate the scanning quality of both a 35 mm film and an $A_4$-sized paper, in this embodiment, the first photoelectric sensing element 21 is accomplished by an $A_4$-sized CCD with 1200 dpi resolution (about 10200 pixel points and with a price of $ 8~12), while the second photoelectric sensing element 23 is accomplished by an $A_4$-sized CCD with 600 dpi resolution (about 5100 pixel points and with a price of $ 3~5). It is about $150~200 cheaper than the $A_4$-sized CCD with 3600 dpi resolution. The embodiment will save a lot in the cost price of CCD. The resolution of the first lens module 222 in the first light transmitting device 22 is 1200 dpi, and the resolution of the second lens module 242 in the second transmitting device 24 is 3600 dpi.

Figure 1B:
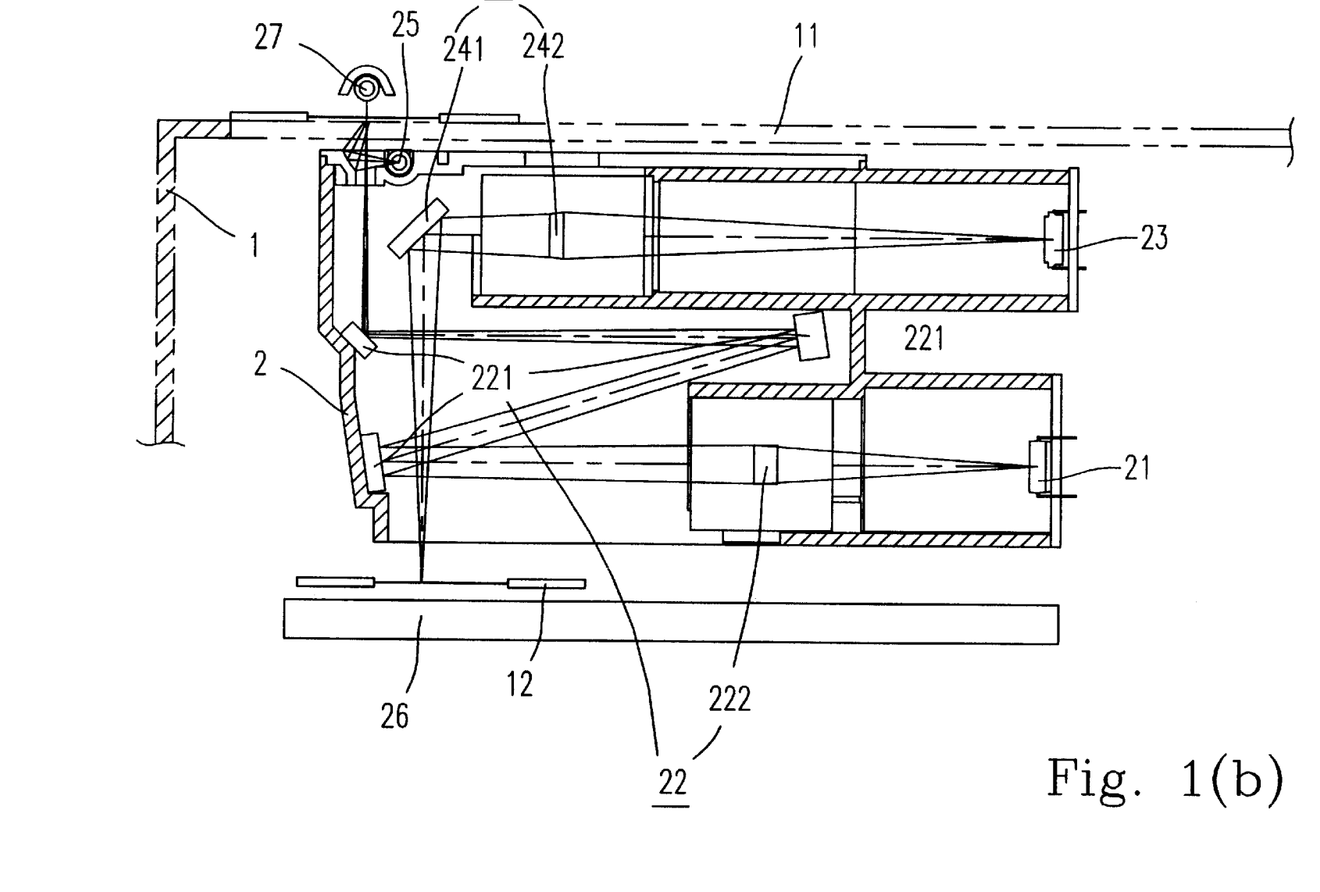

Moreover, the first light source 25 mounted fixedly on the supporting base 2 is used for providing a light source to the first scanning platform 11 while the scanning operation of the reflective document (such as a $A_4$-sized paper) is performed. The second light source 26 mounted fixedly on the supporting base 2 is employed for providing a light source to the second scanning platform while the scanning operation of the penetrative document (such as a 35 mm film) is performed. However, in order to reduce the assembling components, the assembling time and space, the second light source 26 is preferably replaced with a background module, as shown in FIG. 1(b). In that way, the scanner thickness, the number of assembling components, and the assembling time can be highly reduced.

In order to provide a light source to the large-sized penetrative document placed on the first scanning platform while the low resolution scanning operation is performed, the extra third light source 27 mounted above the first scanning platform is added to the present invention. It uses the first light transmitting device 22 to focus and transmit to the first photoelectric sensing element 21 to be received, wherein the third light source can be a single light source (tube) or a background module.

Figure 2A:
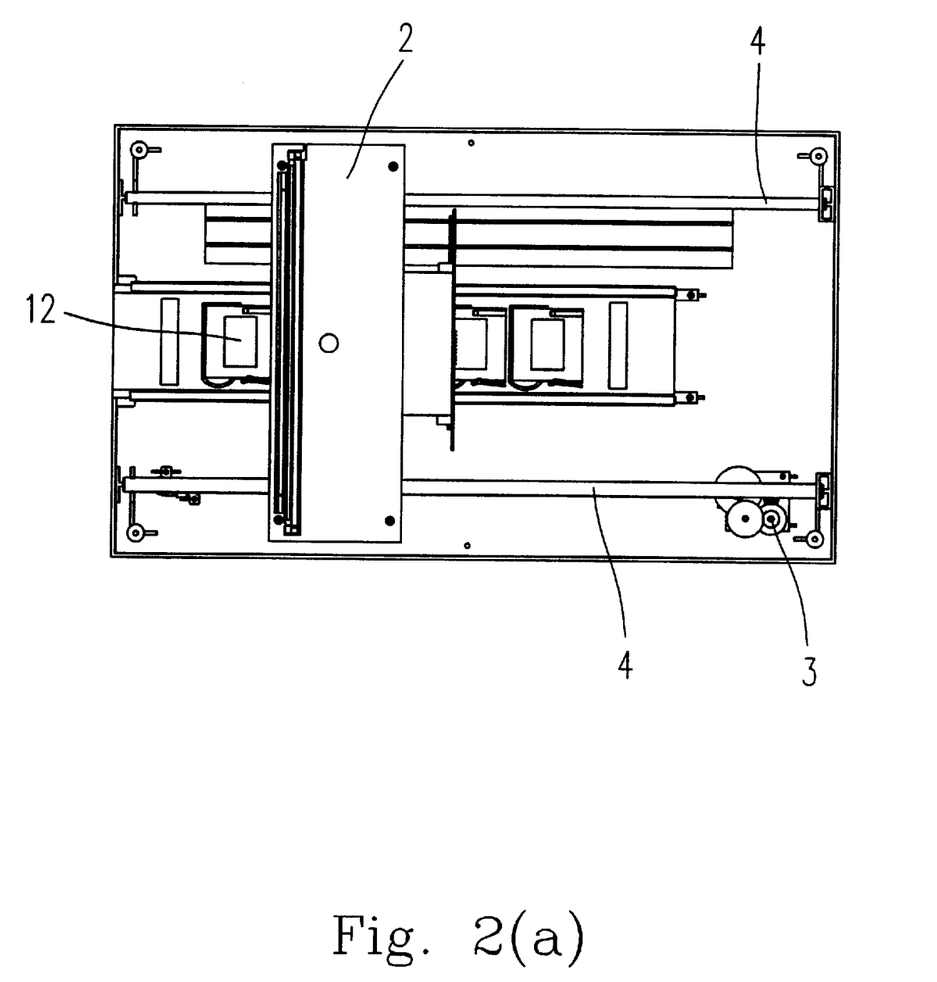
FIGS. 2(a)–2(d) are respectively schematic diagrams of top view, sectional view and perspective view, showing the preferred embodiment for the image scanner capable of scanning reflective and penetrative documents according to the present invention.
Figure 2B:
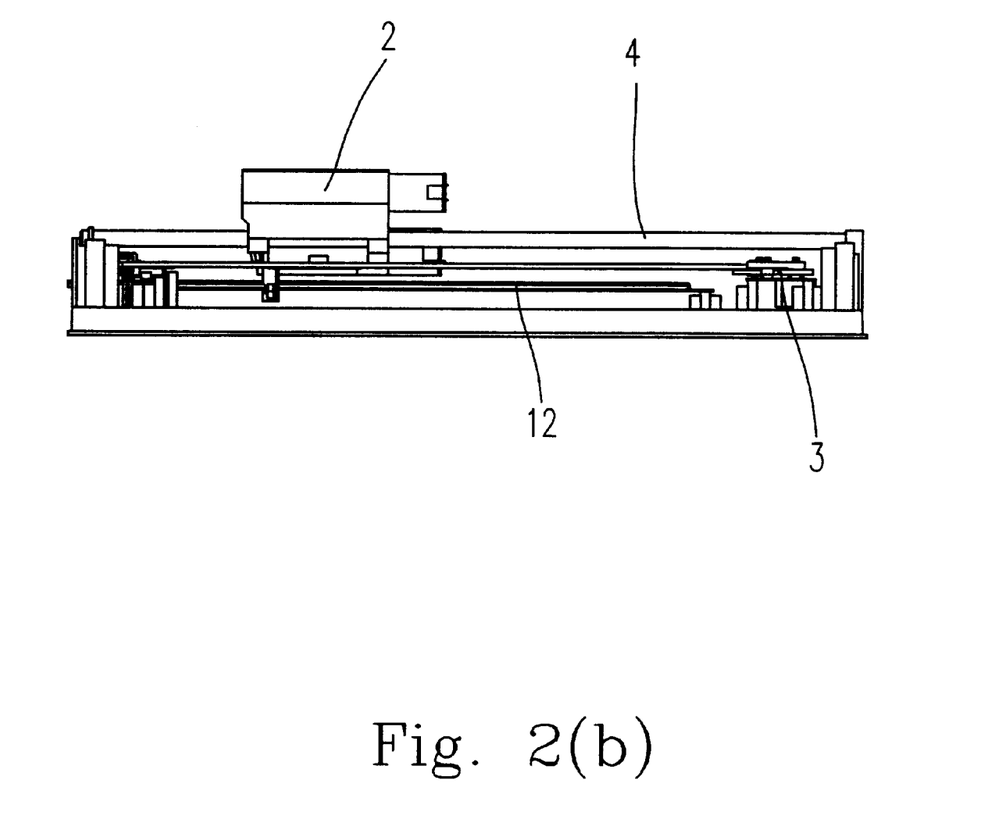
Figure 2C:
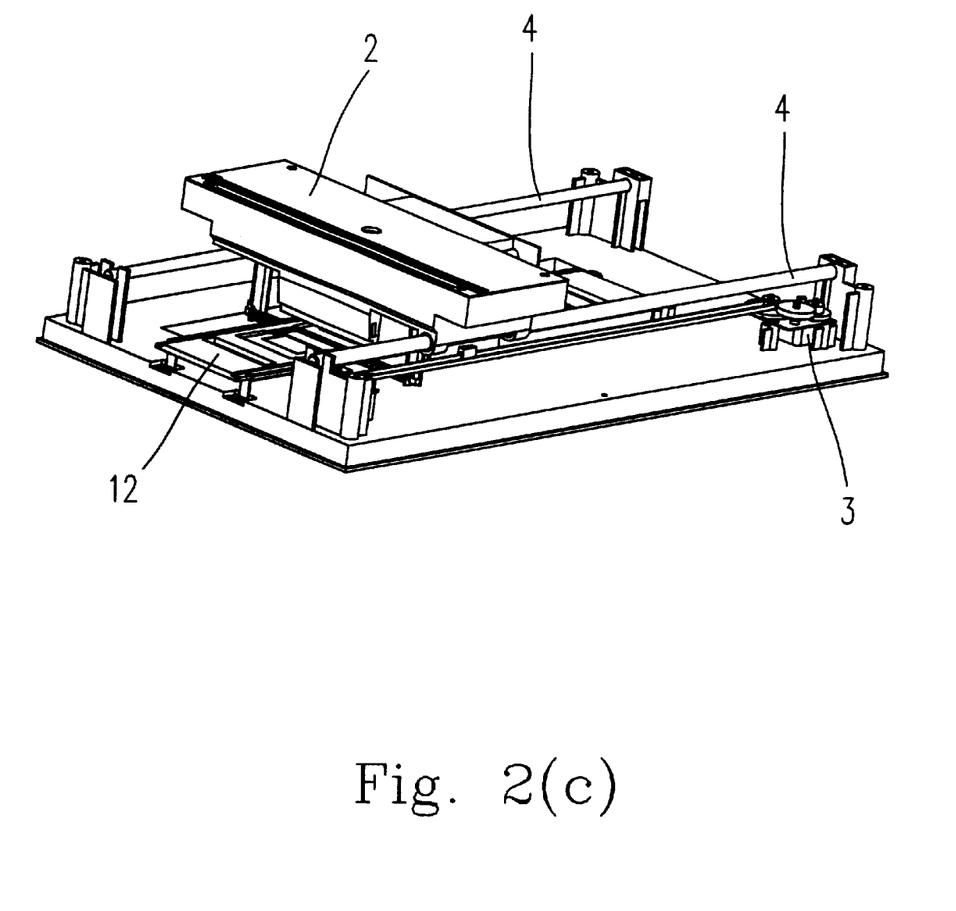
Figure 2D:
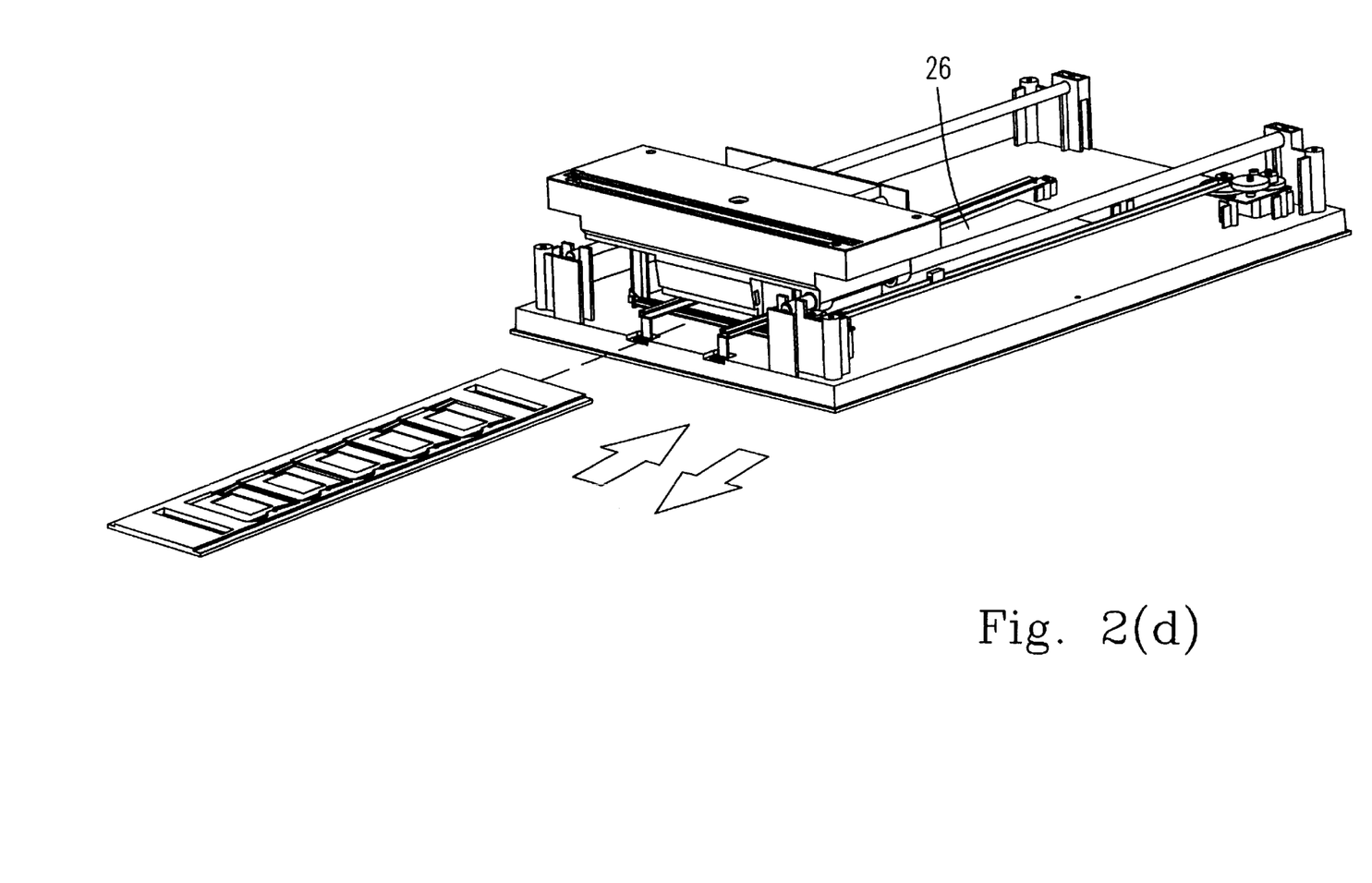

Please refer to FIGS. 2(a), (b) and (c). The supporting base 2 moves along the slideway 4 by the stepping motor 3. The second scanning platform 12 is composed of many film supporting bases. FIG. 2(d) is a schematic diagram showing the second light source 26 is replaced by a background module.

Figure 3:
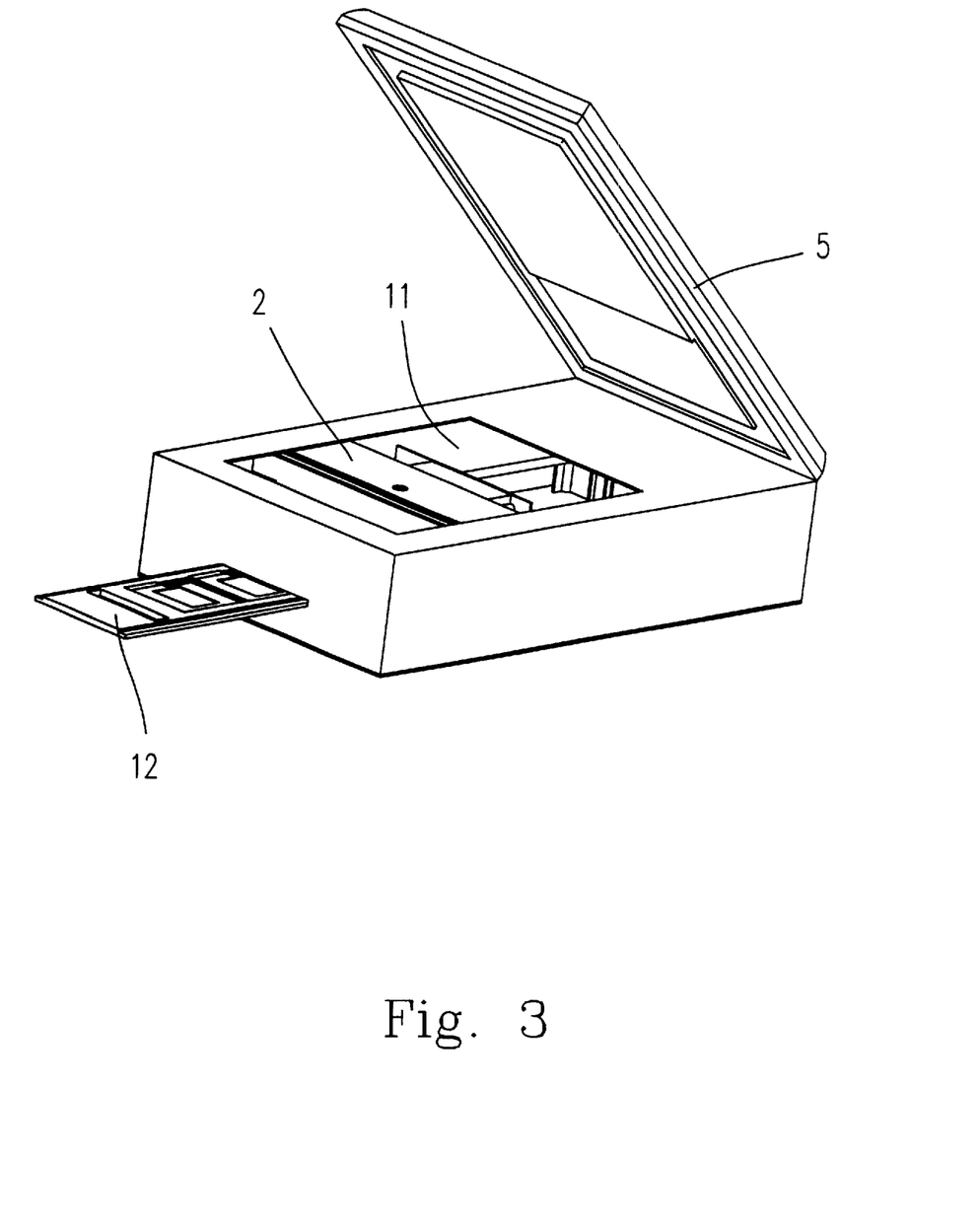
FIG. 3 is a schematic diagram of the appearance showing the preferred embodiment for the image scanner capable of scanning reflective and penetrative documents according to the present invention.

Please refer to FIG. 3, it shows clearly the related position between the scanner lift-cover 5, the first scanning platform 11 and the supporting base 2, wherein the scanner lift-cover 5 can be a lift-cover or a light source module.

From the previous description, the following functions can be achieved in the present invention:

1. Independent optical system design: The reflective and penetrative document optical systems are independent respectively. It can be co-operated with different CCD according to different requirement of resolution to fit the practical needs when the consumer is using, especially when the high resolution scanning quality of the penetrative document is needed.

2. Simple structure: The two independent optical systems mentioned above are mounted fixedly on the same supporting base to proceed the adjustment without other inside switching mechanism. Consequently, the variability is lower and the productive yield is increased.

3. Optimum of the transmission mechanism system: Due to the module organization of the optical and transmission mechanism system, it is easy to achieve the purpose of transmitting scanning by using a single transmission mechanism without needing any other transmission mechanism.

4. The user can choose two different scanning pathways (the upper or beneath one) to scan the penetrative document in the way of large-size with low resolution or small-size with high resolution according to the different requirement for resolution.

5. Product variety: The product can be divided into two forms according to different needs. One is with an ordinary lift-cover (without the third light source 27) and capable to scan one kind of penetrative document (small-size with high resolution), the other is with the third light source 27 and capable to scan two kinds of penetrative document, wherein the third light source 27 can be a background module or a single light tube moved synchronally. It is therefore to solve problems occurred in the traditional device completely and achieve the main purpose of the present invention.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. An image scanner capable of scanning reflective and penetrative documents, comprising:
    a housing;
    a supporting base mounted in said housing and moving along a first direction while the scanning operation is performed;
    a first scanning platform mounted on said housing for placing thereon said reflective document to be scanned;
    a first light transmitting device mounted fixedly on said supporting base for focusing and transmitting light signal reflected from said reflective document to said first photoelectric sensing element;
    a first photoelectric sensing element mounted fixedly on said supporting base and having a first number of pixel sensing points for receiving said reflected light signal and converting said received light signal into electric signal;
    a second scanning platform mounted in said housing for placing thereon said penetrative document to be scanned;
    a second light transmitting device mounted fixedly on said supporting base for focusing and transmitting light signal penetrating through said penetrative document to said second photoelectric sensing element; and
    a second photoelectric sensing element mounted fixedly on said supporting base and having a second number of pixel sensing points for receiving said penetrating light signal and converting said penetrating light signal into electric signal, where in said first number is larger than said second number.

2. The image scanner according to claim 1, wherein said housing is a flat bed image scanner housing.

3. The image scanner according to claim 1, wherein said first photoelectric sensing element and said second photoelectric sensing element are accomplished by charge-coupled devices (CCD).

4. The image scanner according to claim 1, wherein said first light transmission device comprises:
    a first reflective mirror module mounted fixedly on said supporting base for reflectively transmitting said reflected light signal from said reflective document; and
    a first lens module mounted fixedly on said supporting base for focusing said reflected light signal reflected from said first reflective mirror module to said first photoelectric sensing element to be received.

5. The image scanner according to claim 1, wherein said second light transmission device comprises:
    a second reflective mirror module mounted fixedly on said supporting base for reflectively transmitting said penetrating light signal from said penetrative document; and
    a second lens module mounted fixedly on said supporting base for focusing said reflected light signal reflected from said second reflective mirror module to said second photoelectric sensing element to be received.

6. The image scanner device according to claim 1, wherein said reflective and penetrative documents are a paper document and a film.

7. The image scanner according to claim 1, further comprising a first light source mounted fixedly on said supporting base for providing a light source to said first scanning platform while said scanning operation of said reflective document is performed.

8. The image scanner according to claim 1, further comprising a second light source mounted fixedly on said supporting base for providing a light source to said second scanning platform while said scanning operation of said penetrative document is performed.

9. The image scanner device according to claim 1, further comprising a second light source mounted fixedly on said housing, and which is made of background light source module for providing a light source to said second scanning platform while said scanning operation of said penetrative document is performed.

10. The image scanner device according to claim 1, further comprising a third light source mounted above said first scanning platform for providing a light source to penetrate a second penetrative document placed on said first scanning platform while the scanning operation of said second penetrative document is performed.

11. The image scanner according to claim 10, wherein a penetrating light signal from said second penetrative document is focused by said first light transmission device and transmitted to said first photoelectric sensing element.

12. The image scanner according to claim 1, wherein the resolution of said second light transmission device is better than that of said first light transmission device.

* * * * *

UNITED STATES PATENT AND TRADEMARK OFFICE
CERTIFICATE OF CORRECTION

PATENT NO. : 6,542,279 B2
APPLICATION NO. : 09/934733
DATED : April 1, 2003
INVENTOR(S) : Lee et al.

It is certified that error appears in the above-identified patent and that said Letters Patent is hereby corrected as shown below:

On the Title Pg Item (75) The Inventors names should read: "Ta Yi LEE" and "Chang Yao LIN"

Signed and Sealed this

Sixth Day of October, 2009

David J. Kappos
*Director of the United States Patent and Trademark Office*